(12) United States Patent
Durrant et al.

(10) Patent No.: US 7,096,387 B2
(45) Date of Patent: Aug. 22, 2006

(54) METHOD AND APPARATUS FOR LOCATING A FAULTY DEVICE IN A COMPUTER SYSTEM

(75) Inventors: Paul Durrant, Slough (GB); Stephen R Hanson, Aldworth (GB); David S Gordon, Farnborough (GB); Hossein Moiin, London (GB)

(73) Assignee: Sun Microsystems, Inc., Santa Clara, CA (US)

( * ) Notice: Subject to any disclaimer, the term of this patent is extended or adjusted under 35 U.S.C. 154(b) by 494 days.

(21) Appl. No.: 10/094,434

(22) Filed: Mar. 8, 2002

(65) Prior Publication Data

US 2002/0138782 A1    Sep. 26, 2002

(30) Foreign Application Priority Data

Mar. 23, 2001    (GB) ................................ 0107372.5

(51) Int. Cl.
G06F 11/00    (2006.01)
(52) U.S. Cl. ............................ 714/31; 714/25; 714/43; 710/15
(58) Field of Classification Search ................ 714/1–3, 714/5, 25–27, 30, 31, 44, 45, 43, 47; 702/183–185; 706/911, 916; 710/15
See application file for complete search history.

(56) References Cited

U.S. PATENT DOCUMENTS

| 4,554,661 A | * | 11/1985 | Bannister ...................... 714/45 |
| 4,649,515 A | | 3/1987 | Thompson et al. |
| 4,727,545 A | | 2/1988 | Glackemeyer et al. |
| 5,090,014 A | * | 2/1992 | Polich et al. .................. 714/26 |

(Continued)

OTHER PUBLICATIONS

Search Report application No. GB 0107372.5 dated Dec. 17, 2001.

*Primary Examiner*—Robert Beausoliel
*Assistant Examiner*—Philip Guyton
(74) *Attorney, Agent, or Firm*—Meyertons Hood Kivlin Kowert & Goetzel, P.C.; B. Noël Kivlin

(57) ABSTRACT

A computer system comprises a processor (2), memory (4) and a plurality of devices (6, 8, 12), the processor (2) and the memory (4) being operable to effect the operation of a fault response processor (AFR), and a device driver (GRAPHICS, NETWORK, H2IO, IO2L, SERIAL) for each of the devices. The fault response processor (AFR) is operable to generate a model which represents the processor (2), the memory (4) and the devices (6, 8, 12) of the computer system and the inter-connection of the processor (2), memory (4) and the devices (GRAPHICS, NETWORK, H2IO, IO2L, SERIAL). The device driver (GRAPHICS, NETWORK, H2IO, IO2L, SERIAL) for each of the devices (6, 8, 12) is arranged, consequent upon a change of operational status of the device, to generate fault report data indicating whether the change of status was caused internally within the device or externally by another connected device. The devices of the computer system may be formed as a plurality of Field Replaceable Units (FRU). The fault response processor (AFR) is operable, consequent upon receipt of the fault reports from the device drivers (GRAPHICS, NETWORK, H2IO, IO2L, SERIAL) to estimate the location of a FRU containing a faulty device by applying the fault indication to the model. In other embodiments the fault report data includes direction information indicating a connection between the device and the other connected device which caused the external fault. Having identified the faulty device the FRU may be replaced, thereby minimizing down time of the computer system.

47 Claims, 9 Drawing Sheets

U.S. PATENT DOCUMENTS

| | | |
|---|---|---|
| 5,109,486 A | 4/1992 | Seymour |
| 5,214,653 A * | 5/1993 | Elliott et al. ............... 714/26 |
| 5,293,556 A * | 3/1994 | Hill et al. ............... 702/184 |
| 5,394,543 A | 2/1995 | Hill et al. |
| 5,436,909 A * | 7/1995 | Dev et al. ............... 714/4 |
| 5,561,760 A | 10/1996 | Ferris et al. |
| 5,587,930 A * | 12/1996 | Hori et al. ............... 702/185 |
| 5,655,068 A | 8/1997 | Opoczynski |
| 5,712,967 A * | 1/1998 | Grossman et al. ............... 714/3 |
| 5,815,652 A * | 9/1998 | Ote et al. ............... 714/31 |
| 5,838,899 A | 11/1998 | Leavitt et al. |
| 6,000,040 A * | 12/1999 | Culley et al. ............... 714/31 |
| 6,349,335 B1 | 2/2002 | Jenney |
| 6,385,665 B1 * | 5/2002 | Canady et al. ............... 710/2 |
| 6,460,151 B1 * | 10/2002 | Warwick et al. ............ 714/718 |
| 6,523,140 B1 | 2/2003 | Arndt et al. |
| 6,532,552 B1 * | 3/2003 | Benignus et al. ............. 714/25 |
| 6,557,121 B1 | 4/2003 | McLaughlin et al. |
| 6,594,774 B1 | 7/2003 | Chapman et al. |
| 6,640,151 B1 * | 10/2003 | Somekh et al. ............. 700/121 |
| 6,678,839 B1 | 1/2004 | Mori |
| 6,697,962 B1 | 2/2004 | McCrory et al. |
| 2001/0003835 A1 | 6/2001 | Watts |
| 2002/0138782 A1 | 9/2002 | Durrant et al. |
| 2003/0028823 A1 * | 2/2003 | Kallela et al. ............... 714/26 |
| 2004/0103181 A1 | 5/2004 | Chambliss et al. |

* cited by examiner

METHOD AND APPARATUS FOR LOCATING A FAULTY DEVICE IN A COMPUTER SYSTEM

BACKGROUND OF THE INVENTION

The present invention relates to computer systems.

There are many fields in which mankind has become reliant on computers to perform valuable and sometimes essential functions. The reliance on computer systems demands that the down time of computer systems is as small as possible. The down time of a computer system is a period during which a computer system is inoperable as a result of a fault in the system. If a computer system goes down, the inconvenience and loss of revenue and indeed life endangering effects can be substantial. As result, the reliability of computer systems is arranged to be as high as possible.

In a co-pending U.S. patent application, Ser. No. 09/097,485, a fault tolerant computer system is disclosed in which multiple processing sets operate to execute substantially the same software, thereby providing a amount of redundant processing. The redundancy provides a facility for detecting faults in the processing sets and for diagnosis and automatically recovering from the detected faults. As a result, an improvement in the reliability of the computer systems is effected, and consequently the down time of such fault tolerant computer systems is likely to be substantially reduced.

Computer systems are generally comprised of a processor and memory connected via an I/O bus to utility devices which serve to provide under control of the processor particular functions. Although redundant processing sets within a computer system provide a facility for detecting, diagnosing and recovering from errors in the processing sets, the utility devices within the computer system, including the connecting buses and peripheral buses, may fail from time to time. A device failure can cause disruption in the operation of the computer system, and may even cause the computer system to go down. Conventionally, detecting and identifying a faulty device has required the presence of a skilled technician.

It is therefore desirable to provide a computer system in which a faulty device or a replaceable unit containing the faulty device can be readily identified, so that repair can be effected quickly, and down time of the computer system can be reduced.

SUMMARY OF THE INVENTION

In accordance with one aspect of the invention, there is provided a computer system comprising a plurality of devices, a fault response processor and a plurality of device drivers. Each device driver is associated with one of the plurality of devices. The fault response processor is operable to generate a model which represents the devices of the computer system and the inter-connection of the devices. The device driver for each of the devices is operable, consequent upon a change of operational status of the device, to generate fault report data indicating whether the change of status was caused internally within the device or externally by another connected device. The fault response processor is thereby operable, consequent upon receipt of the fault report data from the device drivers to estimate the location of a faulty device by applying the fault indication to the model.

A model of a computer system provides a structure for analysing fault reports. By providing device drivers which generate fault reports which include an indication of whether a change of operational status occurred internally or externally, a fault response processor can generate automatically an estimate from the fault reports of a device which is likely to be faulty, or a group or groups of devices which include at least one device which is likely to be faulty. In effect therefore, an indication may be generated automatically of a faulty device or group of devices which may therefore be replaced without the requirement for qualified personnel to interpret the fault reports insitu. Such devices may be for example a peripheral device which may be 'hot-insertable' which provide an arrangement in which a device may be replaced within a computer system without down time. For example, this is advantageous as the computer system may be installed at a site at which no technically qualified personnel are available to diagnose fault reports. As will be understood, the group of faulty devices may include a bus or buses which connect other devices in the group together.

Another aspect of the invention provides a fault response processor for use in identifying at least one of a plurality of devices of a system, the fault response processor being operable to generate a data model having a structure which represents the plurality of devices of the system and the inter-connection of the devices, to receive fault report data, generated by device drivers following a change in the operational status of the device associated with the device, the fault report data indicating whether the change of status was caused internally within the device or externally by another connected device, and to estimate the location of a faulty device, within the model, by applying the fault indication, from the device drivers, to the model.

According to a further aspect of the present invention, there is provided a method of locating faulty devices of a system, the method comprising providing a model of the system which model represents the inter-connection of the devices via at least one data path, generating fault report data, consequent upon a change of operational status of at least one of the devices, the fault report data indicating whether the change of status was caused internally within the device or externally by another connected device, and estimating the location of a faulty device, within the model, by applying the fault indication, from the device drivers, to the model.

According to a further aspect of the present invention there is provided a method of maintaining a computer system comprising performing the above method of locating faulty devices or groups of devices of a computer system, and replacing the faulty device or group of devices with a replacement device.

An aspect of the invention also provides a computer program providing computer executable instructions, which when loaded onto a computer configures the computer to operate as the computer system according to the present invention, or configures the computer to operate as a fault response processor, or configures the computer to operate as a device driver. An aspect also includes a computer program product comprising a computer readable medium having recorded thereon information signals representative of the computer program.

The computer readable medium can be any form of carrier medium for carrying computer program code, whether that be a magnetic, optical or any other form of data storage such as a tape, disk, solid state, or other form of storage providing random or read-only or any other form of access, or a transmission medium such as a telephone wire, radio waves, etc.

BRIEF DESCRIPTION OF THE DRAWINGS

Embodiments of the present invention will be described hereinafter, by way of example only, with reference to the accompanying drawings in which like reference signs relate to like elements and in which.

DESCRIPTION OF EXAMPLE EMBODIMENTS

Embodiments of the present invention find particular application with a computer system having a plurality of devices which are controlled by device drivers which typically form part of user software executed on a central processor unit. As mentioned above, the devices of the computer system may be divided into groups, each group may contain a single device or a plurality of devices. Each group may be incorporated as part of a Field Replaceable Unit (FRU). A FRU is an item of hardware that can be added to or removed from a system by a customer or by a service engineer at a site where a computer system is installed. A computer system could be constructed entirely of FRUs. A desktop computer system, for example, in its simplest form may have a single FRU on which all the hardware devices of the desktop computer are incorporated, except for a monitor and keyboard which may form separate FRUs. A server however may be constructed of many FRUs: motherboards, CPU sets, peripherals, disks, for example which are interconnected.

The FRUs of a computer system will typically have an interdependent hierarchy, which is related to a hierarchical inter-relationship of the devices of the computer system, although a FRU may contain more than one device and so there may not be a direct correspondence between the device hierarchy and the FRU hierarchy.

Figure 1:
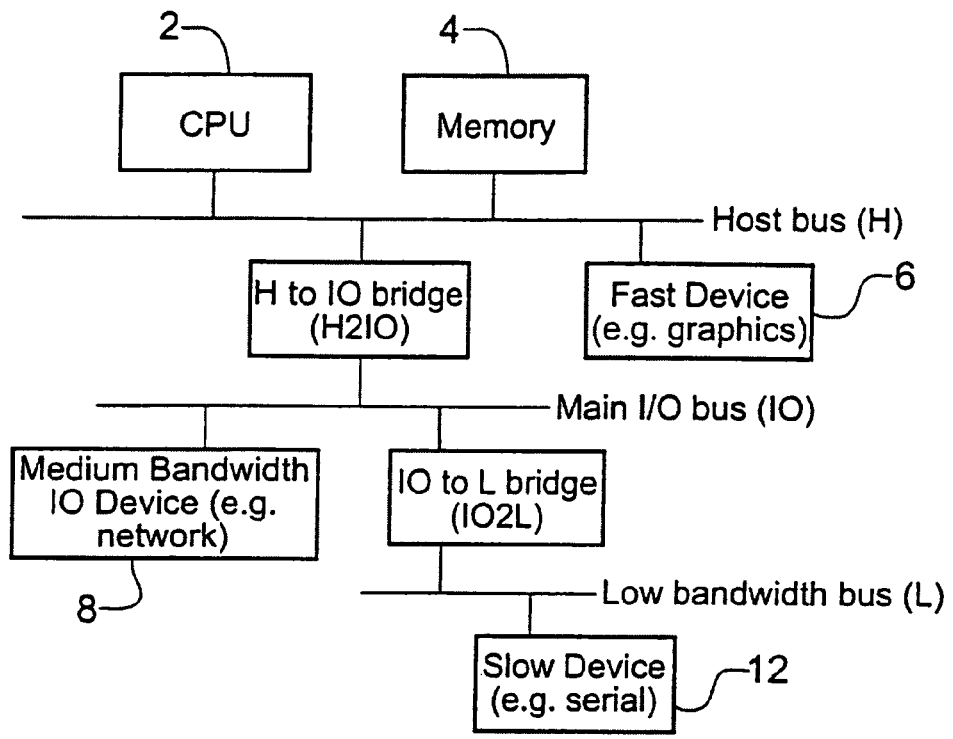
FIG. 1 is a schematic overview of an example computer system.

Within a computer system the kernel software arranges the devices of the system in accordance with the device hierarchy. An example of a computer system with which the present invention finds application is shown in FIG. 1. In FIG. 1 a CPU 2, and memory 4 are connected to a host bus H. Also connected to the host bus H is a host bus to IO bus bridge H2IO and a graphics device 6. The host to IO bus bridge is connected to a main I/O bus IO, to which is connected a network device 8 and an IO to L bridge IO2L. The network device is representative of a medium bandwidth device. A slow device 12 such as one which may be operating a serial interface is connected to the IO to L bridge via a low bandwidth bus L.

Figure 2:
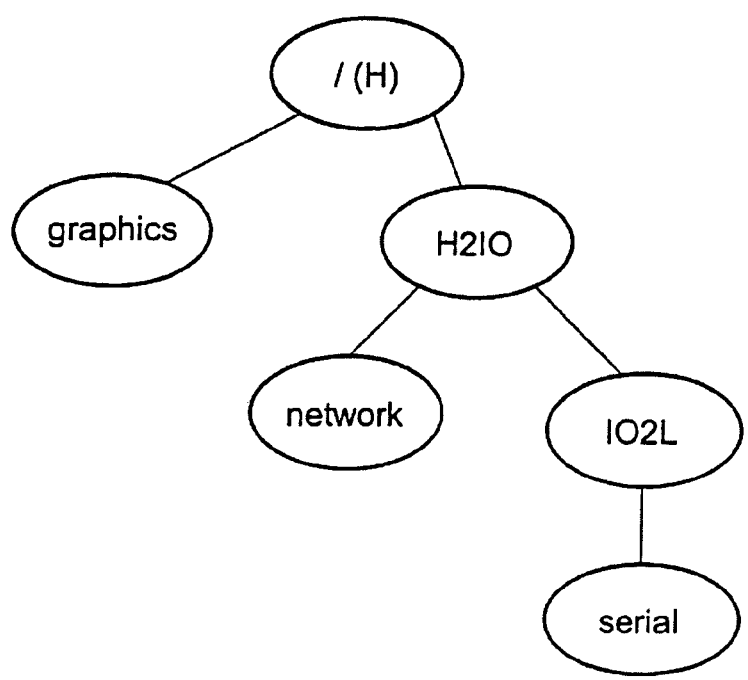
FIG. 2 is a schematic block diagram showing the data paths between the drivers for the devices of FIG. 1.

The devices of the computer system shown in FIG. 1 can be regarded as forming a hierarchical tree structure. At the root of the hierarchy is a node representing the host bus H of the system, which is the bus to which the CPU 2, and memory 4 are connected. Nodes for peripheral devices such as Ethernet chips, and serial UARTs form the leaves of the tree structure which are attached below nodes representative of the buses to which these devices are attached. The device tree structure for the computer system of FIG. 1 is shown in FIG. 2. The device tree shown in FIG. 2 represents the data paths between the drivers of the devices of the computer system of FIG. 1. Each device in the hierarchy has an associated device driver.

Figure 3:
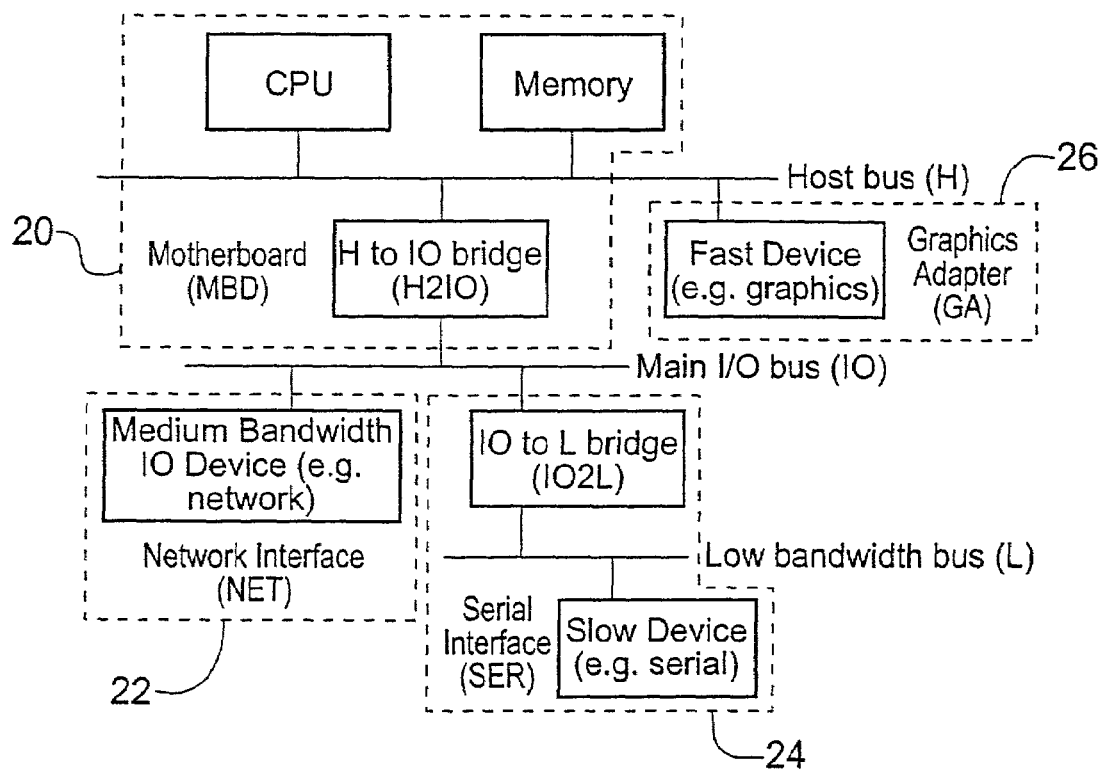
FIG. 3 is a schematic representation of Field Replaceable Units from which the computer system of FIG. 1 is comprised.
Figure 4:
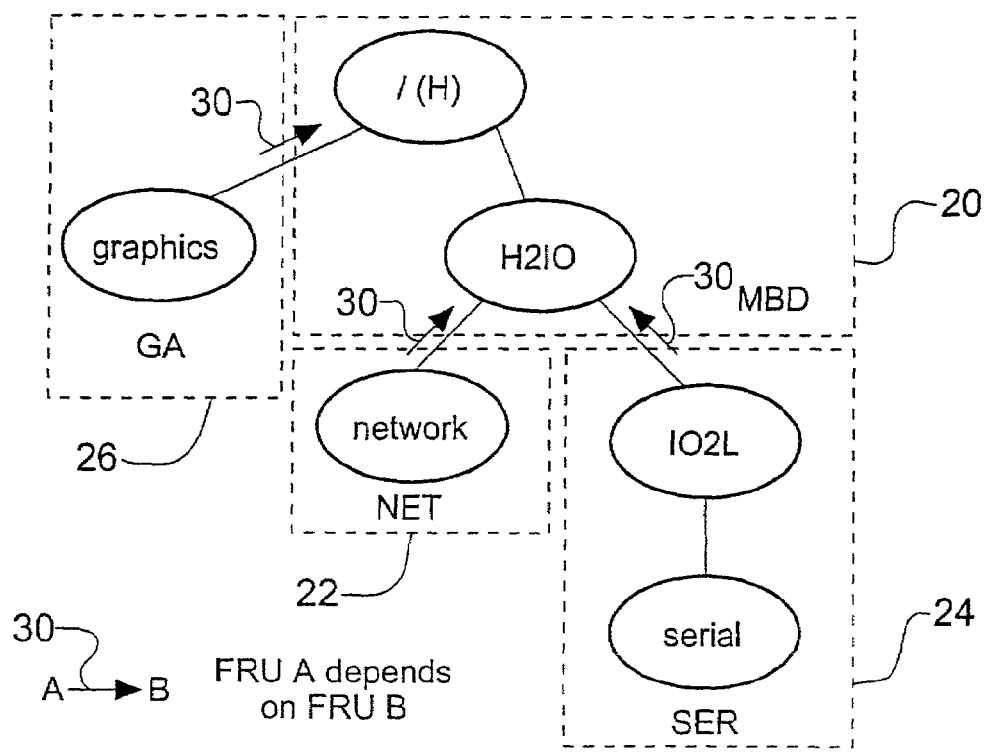
FIG. 4 is a schematic diagram illustrating an inter-relationship of the Field Replaceable Units of FIG. 3.

The devices shown in FIG. 2 will be incorporated within one or more FRUs. The computer system is constructed from these FRUs. FIG. 3 provides an example mapping of the devices of the computer system shown in FIG. 1 on to four FRUs 20, 22, 24, 26. A first FRU 20 forms a motherboard of the computer system, a second FRU forms a graphics device 26, a third FRU 22 forms a network interface and a fourth FRU 24 forms a serial interface 24. In accordance with the device hierarchy shown in FIG. 2, a relative dependency will be formed upon the FRUs of the computer system. Accordingly for the present example, this is illustrated in FIG. 4, where the FRU structure shown in FIG. 3 is illustrated with a relative dependency illustrated by arrows 30.

Generally, the relative dependent relationship between the FRUs and the mapping between FRU and device hierarchies is maintained in a library file.

Embodiments of the present invention provide a facility for readily identifying a FRU of the computer system which contains a device which has developed a fault. A FRU which contains a device which has developed a fault will be referred to in the following description as a faulty FRU. This is provided by an Automatic Fault Response processor. The faulty device may be for example one of the peripheral devices, but may also be one of the connecting buses H, H2IO, IO2L. As will be explained shortly, the most likely FRU which contains the faulty device is identified from fault reports generated by device drivers within the kernel software running on the CPU.

Device Drivers

Figure 5:
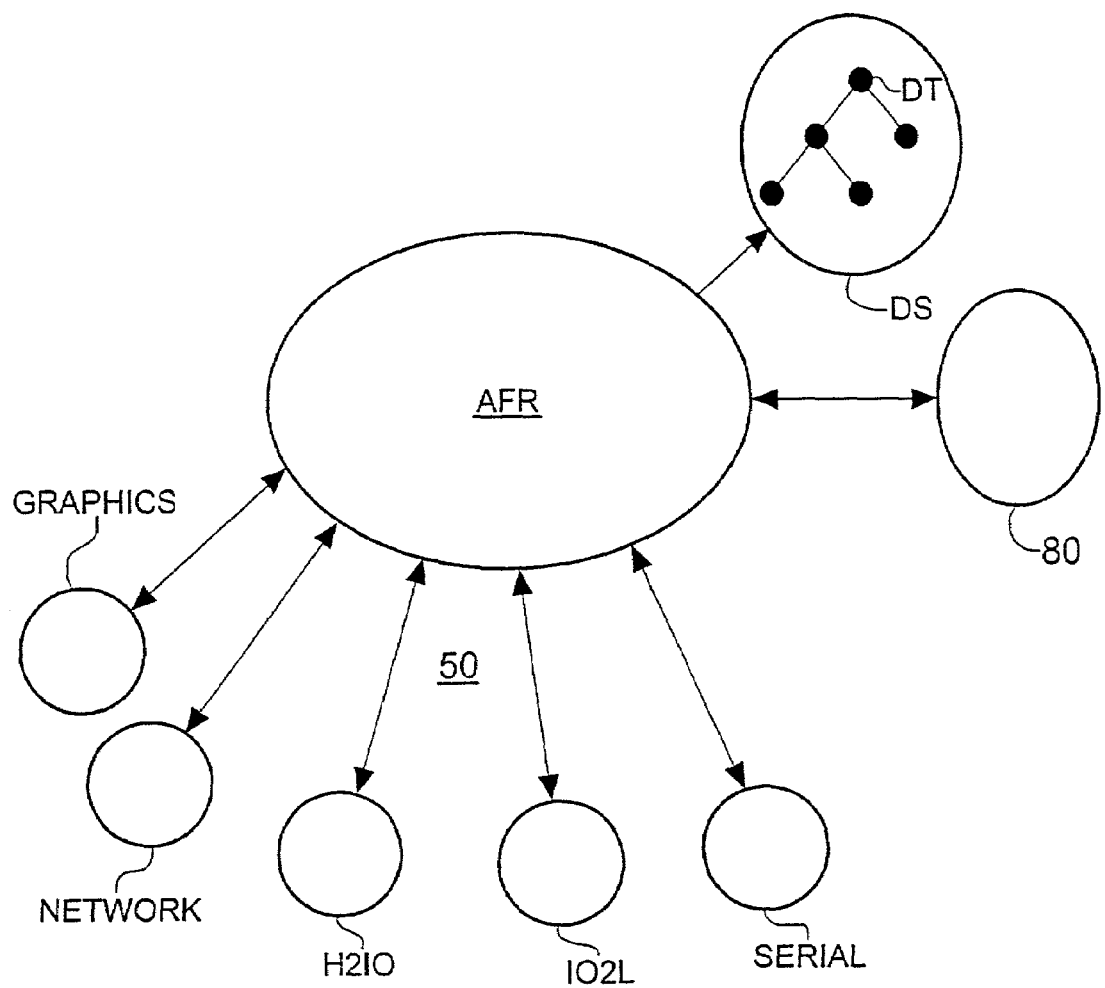
FIG. 5 is a schematic representation of an Automatic Fault Response processor coupled to the device drivers for the devices of the computer system shown in FIG. 1.

In FIG. 5 the Automatic Fault Response (AFR) is shown generally to be connected through bi-directional links 50 to the device drivers GRAPHICS, NETWORK, H2IO, IO2L, SERIAL. Each of the device drivers is arranged to control the operation of a corresponding one of the devices which are represented in FIG. 2.

The AFR processor is also shown communicating with a library file 80 of the kernel. The library file 80 provides the relative dependent relationships between the FRUs and the mapping between the FRUs and the device hierarchy.

The device drivers are able to monitor the operation of the devices, through for example, a time for responding to commands, an amount of data processed by the device, a number of memory accesses, whether information is being correctly processed and other measures of relative performance. The devices are therefore able to detect a change in relative performance for the device.

Each of the device drivers GRAPHICS, NETWORK, H2IO, IO2L, SERIAL determines the operational status of the device. When there is a change in operational status a fault report is generated. In one example embodiment, the fault reports have the following fields:

Device datapath e.g./H2IO/IO2L/SERIAL

New state=down, degraded or up

Location=data path fault, device fault(internal) or external fault.

As will be explained shortly, the fault reports generated by the device drivers are used by the AFR processor to identify the FRU or FRUs of the computer system which contain a faulty device, referred to as a faulty FRU. However, in addition to the fault reports, the AFR utilises information from environment sensors. These may form part of the devices within the FRUs or may not be associated with any one device but rather monitor environmental conditions on the FRU as a whole. The sensors provide data which are representative of the values of the sensed parameters provided by the sensors for generating environmental information. The environmental information provides an indication of the operating status of components within the devices with respect to where the sensors are located. The sensed parameters may be for example, temperature, power consumption, or fan speed.

A separate management driver may be provided to interrogate the sensors or to retrieve data produced by the sensor from a cached memory. The management driver may then communicate the environment data to the AFR. Alternatively, the device driver for a device may retrieve the environment data from a sensor associated with the device driver and pass this to the AFR.

Automatic Fault Response Processor

The operation of the AFR processor to detect a faulty FRU from fault reports generated by device drivers will now be explained. The AFR performs two main functions. The first function is to extract information from the fault reports generated by the device drivers and to log the fault reports. The second function is to perform a diagnosis so as to estimate which of the FRUs of the computer system is or are faulty. To do this the AFR first builds a device tree in its own data space. This is represented by FIG. 5 as device tree DT constructed within the data space DS of the AFR. The device tree is constructed by adding or updating nodes for all the devices featured in the data paths of the fault reports collected during a period of time, called an epoch. The tree so constructed is hence not necessarily a complete copy of the full kernel device tree. A new tree is built during each new epoch. A detailed explanation of the formation of epochs will be provided shortly.

In some embodiments, the device tree is built by the AFR as follows:

For each fault report, extract the device data path and use it to search down the current tree for a device node. If no such node exists, create a new one with a state of UP and empty fault location information. If a node does exist, update it according to the following rules:

If the device node state is UP then the location information in the fault report is considered to be the most significant indication of the location of the faulty device. The information is therefore copied into the node in the tree.

If the device node is DEGRADED and the fault report declares service to be LOST, the node state is changed to DOWN and the location information from the fault report is considered to be the most significant fault location.

If the device node is DEGRADED and the fault report declares service to be DEGRADED, or the device node is DOWN and the fault report declares service to be LOST, then the location information from the fault report is considered to be more significant if it indicates a fault higher up the device tree i.e. DATAPATH is more significant then DEVICE, and the DEVICE is more significant than EXTERNAL.

If the fault report declares service to be RESTORED then any location information is cleared from the device node and its state is changed to UP.

The model of the device tree forms the basis of the AFR's analysis. Analysis is performed in three phases. The purpose of the phases is, if possible, to identify the faulty FRU, with each analysis phase providing a further refinement in the estimation of the identity of the faulty FRU. As will be explained shortly, this is effected by assigning a fault probability to the FRU containing some or all of the devices in the device tree and declaring a FRU as faulty if it has a probability which exceeds a predetermined threshold. The three phases will be explained shortly. The formation of the time epochs will now be described.

Time Epochs and Dynamic Tree Building

As explained above the fault reports are analysed within an analysis interval which is referred to in the following description as a 'time epoch'. Time epochs are determined from a rate of arrival of the fault reports. This is because the fault reports generated by the device drivers can be correlated. As such, although only a single device may be faulty, other devices may experience a change in operational status so that several fault reports are generated. As a result, the fault reports may be related, and the relationship may be reflected in a time at which the fault reports are generated. The fault reporting can have, therefore, a certain periodicity as a result of specific operations being performed by that device or an access being made to that device. By identifying, according to this periodicity, a time epoch corresponding to a generation cycle of the fault reports, an improvement in the likelihood of correctly locating the faulty device can be provided. This is represented schematically in FIG. 6.

Figure 6:
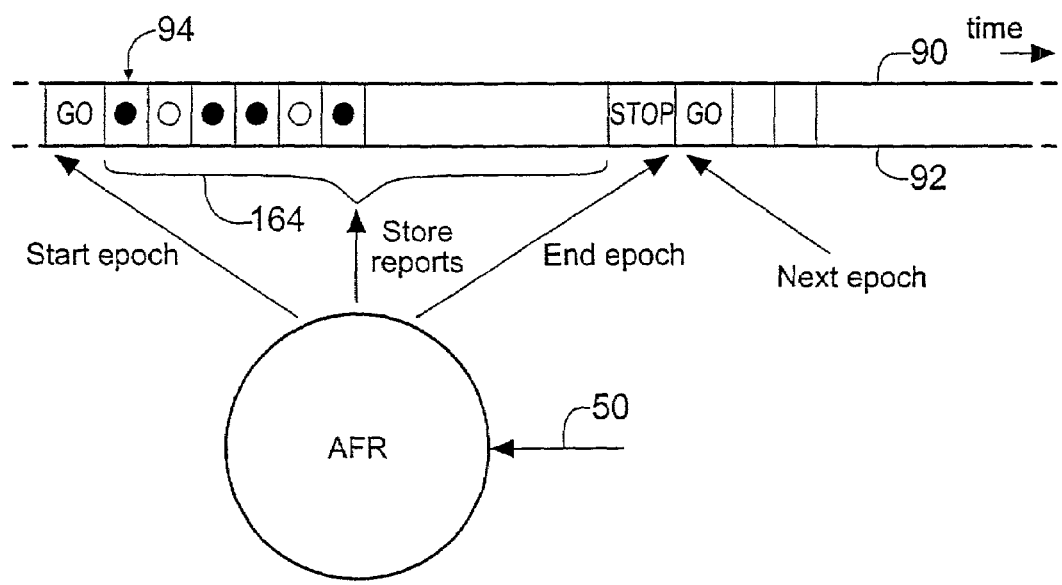
FIG. 6 provides a graphical illustration of a process of identifying analysis intervals (time epochs) used by the Automatic Fault Response processor to analyse fault reports.
Figure 7:
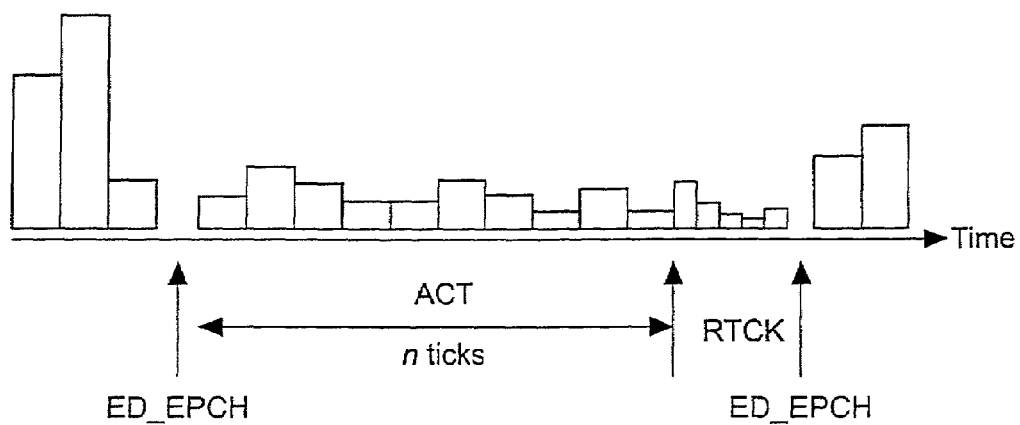
FIG. 7 provides a graphical representation of the analysis intervals (time epochs) identified by the Automatic Fault Response processor.

In FIG. 6 the horizontal lines 90, 92 represent the passage of time going from left to right across the page. Each of the boxes 94 between the horizontal line 90, 92 represents a period during which a fault report or reports may be generated. The fault reports are analysed as mentioned above and used to update the device tree. The reference period is used to identify whether there has been sufficient recent fault report activity to indicate a change in the status of the devices to form the start GO and end STOP a time epoch 164. The reference periods are referred to as ticks and are shown in FIG. 7 which provides a graphical illustration of a number of device node changes in each tick with respect to time.

In order to identify a time epoch, the AFR monitors the device tree model to determine how many new nodes have been added to the device tree model or how many existing nodes have been updated since the previous tick. If there have been no changes since the previous tick but activity on the model has occurred, then an end of epoch is declared, and analysis on the device tree is performed. If there was no quiet period, which corresponds to a tick where there were no changes to the tree, in the last n ticks, then the tick period, T, is halved so that shorter quiet periods can be analysed. The graphical representation provided in FIG. 7 illustrates an analysis period between ends of epochs D_EPCH, and a period RTCK following n ticks without a quiet period ACT, in which the tick period is halved. The time epochs are identified from the rate of arrival of fault reports, and the changes that these fault reports make to the device tree model.

An epoch may continue indefinitely until the device tree changes. Once a change has occurred however, the maximum remaining epoch time as the tick period is progressively halved can be expressed generally by the following expression:

$$nT+nT/2+nT/4+nT/8+ \ldots \rightarrow 2nT$$

There is however one exception to this bound on the epoch length. A time epoch which begins at the start of a boot configuration period of the computer system will continue until the boot configuration has been completed. The AFR processor operates in a first phase, as explained above to identify the time epoch within which it is assumed that the fault reports are correlated. The fault reports for the time epoch are collected and used to construct a device tree by 'decorating' the nodes with the current status of the devices. Operational states are represented by updating the current state of the node with information from the fault report according to the rules given above. The tree structure allows faults to be related hierarchically. Analysis modules of the AFR may use this information to modify the information on the tree.

Analysis Phases

Having built a device tree representing the possibly faulty devices, the AFR proceeds to analyse the device tree in order to attempt to identify the faulty FRU which contains the faulty device. This is done in three phases:

Phase I

The AFR performs phase I by modifying the nodes of the device tree, which was built during the time epoch to eliminate redundant fault reports. This is achieved in accordance with a set of rules. For example, if a parent node indicates a device fault, any fault indicated by a child node may be a false positive and so it may be desirable to clear the fault information of these child nodes. Effectively, the AFR processor is pre-processing the device tree in order to remove any fault reports which are redundant.

EXAMPLE

Figure 8:
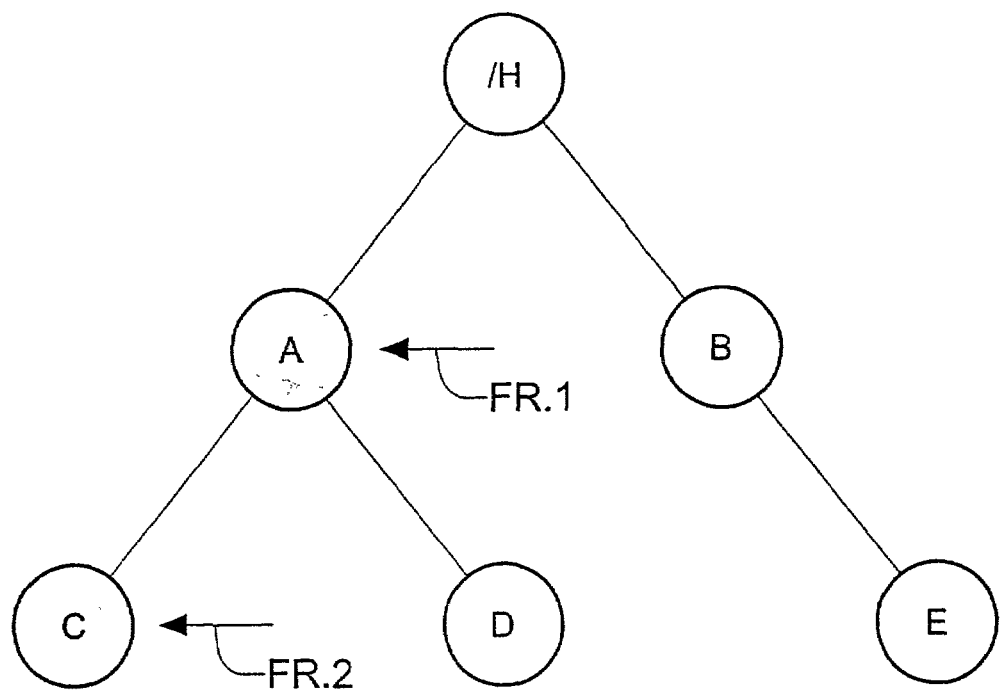
FIGS. 8, 9, and 10, provide example illustrations of an analysis applied by the Automatic Fault Response processor, in which example fault reports are applied to a device tree.

FIG. 8 shows that the drivers for both devices A and C have positively identified their device as having a fault, FR.1, FR.2. In this case the evidence from the driver for device C, FR.2 is discounted, because the fault report was likely to have been triggered as a result of reading bad data through A, although this could not be determined at the time the fault was reported.

Phase II

In the second phase of the operation the device tree is analysed by the AFR to identify a set of faulty FRUs with a non-zero probability of having a fault. For example, if a device node is down and indicating that it is the location of the fault then there is a 100% probability that the FRU containing that device has a fault. If a device node is down and is indicating a fault in its data path and an ancestor is indicating an external fault then the fault is deemed to lie in a FRU containing either of the two devices or a FRU in between (if there is one). Hence a 100% probability is assigned to a set of FRUs but not to an individual.

In some embodiments the AFR is provided with a plurality of analysis modules $M_n$ each of which implements a single type of Phase I, Phase II or Phase III (see below) analysis. In Phase II, for each FRU, each module $M_n$ (that implements a Phase II type of analysis) assigns a (possibly zero) probability $P_n$ that there is a fault on that FRU. The Modules can assign probabilities to more than one FRU. If a FRU receives a non-zero probability of being faulty from more than one module, then the probabilities are combined as follows:

$$(1-P)=(1-P_1)(1-P_2) \ldots (1-P_n)$$

Therefore the probability that a particular FRU is not faulty is the probability that all the modules determine that it is not at fault. After phase III analysis has been performed which will be described shortly, the probability for each FRU is compared with a threshold and if greater than the threshold, then the FRU or FRUs are declared as being faulty.

The following examples provide a further illustration of the analysis of the device tree, to identify a possibly faulty set of FRUs:

Example A

Figure 9:
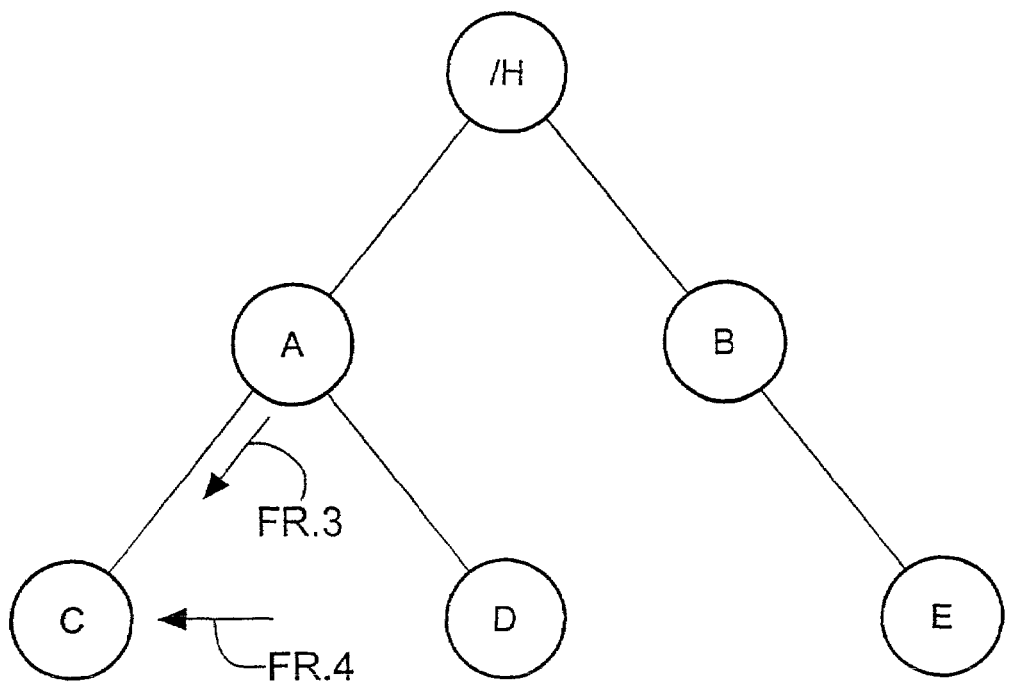

Consider the AFR constructed device tree in FIG. 9. The driver for device A has reported an external fault FR.3 and the driver for device C has positively identified an internal fault FR.4. The device C is unambiguously identified as being in error (P=100%). The FRU containing this device is therefore considered to be faulty.

Example B

Figure 10:
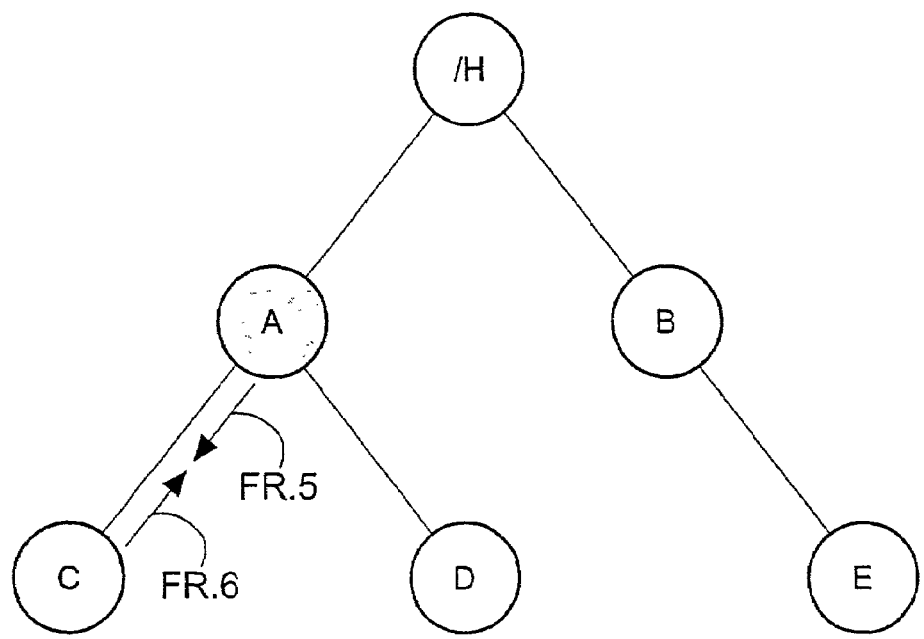

FIG. 10 shows that the driver for device A has reported an external fault FR.5 and the driver for device C have reported a data path fault FR.6. The analysis modules form a probability metric that one of the FRUs contains a faulty device, or that the fault lies somewhere between devices A and C (possibly including the devices themselves). In this case the fault probability that a FRU contains a faulty device is weighted between the number of devices on the FRU. For the present example, if the devices A, C are embodied on the same FRU, then this FRU is assigned a 100% fault probability. If however the two devices are embodied on different FRUs then each FRU is assigned a fault probability of 50%. However, if the fault probability metric generated does not exceed the predetermined probability threshold then no conclusion may be drawn as to the faulty FRU. An improved estimate of the identity of the faulty FRU can be made from analysis performed in accordance with phase III.

Phase III

In a third phase of the operation of the AFR, the list of possibly faulty FRUs from phase II is examined further by applying environmental information provided by appropriate sensors. The information from the sensors from each FRU is checked for environmental problems such as power-loss, over-temperature, etc. This information is used to adjust the fault probabilities of the FRUs.

As illustrated in the examples given above, in some circumstances, the fault report information may not be conclusive and so the estimate of the faulty FRU may only identify a plurality of FRUs which may be faulty. For this reason the phase II analysis is operable to apply environmental reports to the device tree in order, if possible, to produce an improved probability estimate of the faulty FRU.

Figure 11:
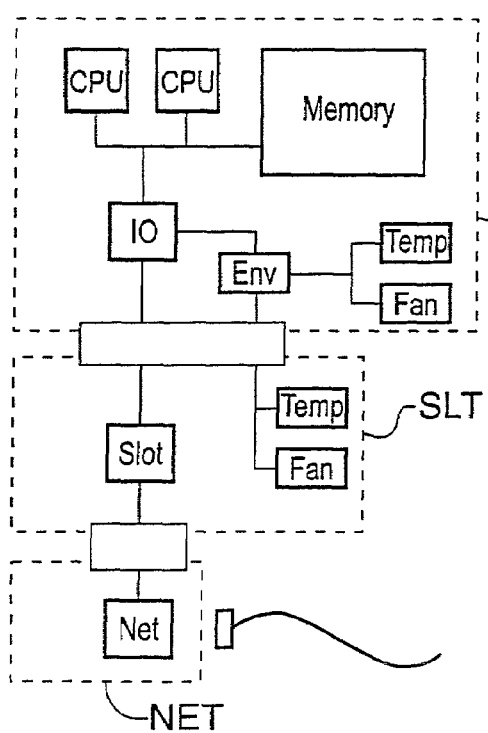
FIG. 11 provides an example of environmental sensors embodied within the Field Replaceable Units forming part of the computer system of FIG. 1.
Figure 12:
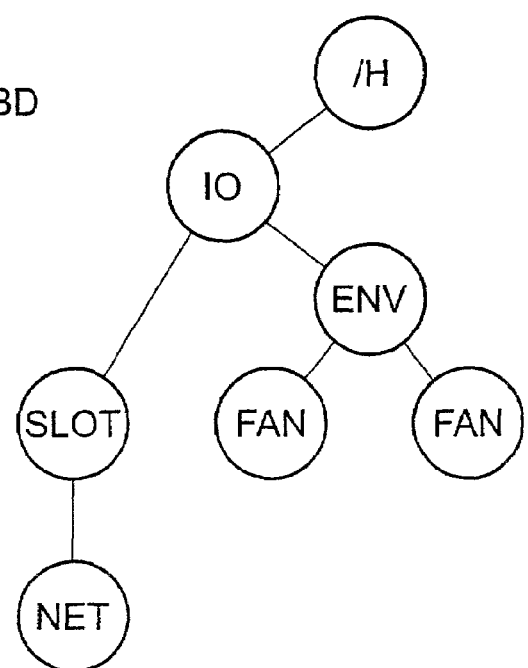
FIG. 12 provides an illustration of a mapping of the environmental sensors onto a device tree.

An example configuration of FRUs is shown in FIG. 11, with the associated device tree shown in FIG. 12. As shown in FIG. 11 the example FRUs are a mother board MBD, a slot SLT and a network card NET which are connected to the mother board FRU. The device tree shown in FIG. 12, also includes environment sensors, which provide sensed parameters relating to temperature TEMP and fan speed FAN.

In the third phase of the analysis, environmental information provided by the sensors TEMP, FAN from the FRUs is applied to the FRU list. In order to reduce the likelihood of false data being provided from the environmental information, a sensor device path may be used to determine whether the sensor device itself is down, in which case the environmental information is disregarded. The AFR processor uses the environment information to improve the estimate of faulty FRUs which resulted from phase II analysis. Where for example, the phase II analysis identifies only a group of FRUs which may be faulty, the environment data can be used to provide a more accurate estimate of the faulty FRU, by selecting a FRU having an abnormal sensor reading. Again, even after the environment information has been applied, it is possible that the estimate of the faulty FRU only identifies a group of FRUs. However it may be sufficient that enough report information has been acquired to identify that one or more FRUs within a group of FRUs are suspected as being at fault. This information is therefore valuable to a technician assigned to repair the computer system and to this end this information is generated with the fault reports on a graphical user interface to be accessed by the technician assigned to repair the computer system.

When all three phases of analysis are complete, the resultant list of FRU fault probabilities is examined and compared against a threshold value, for example, 90%. Any FRU having a fault probability in excess of this is deemed to have failed. The AFR indicates that a FRU is faulty, by marking the FRU as such. In some embodiments, a message is generated by the AFR, which is written to a non-volatile storage on the faulty FRU. The faulty FRU may be indicated by causing an LED to illuminate on the FRU. The operation of the post-analysis phase will now be explained in more detail.

Post Analysis Phase

If a FRU can be positively identified as being faulty, a repair technician can be alerted to this fact and to this end the AFR processor may signal that a FRU is faulty through an interface which is used to change the state of the FRU to faulty. This may be notified to a repair and maintenance organisation. Furthermore the FRU may carry a 'change me' LED so that the FRU can be easily identified by a technician. Alternatively, where a group of FRUs are suspected as being faulty, then each can be signalled as being possibly faulty. Accordingly, it will be appreciated that there are various ways for providing an external signal to indicate that a FRU is faulty, to a technician. Furthermore, the fault diagnosis may be written into a non-volatile storage medium on a board into which the FRU is loaded to aid diagnosis when the FRU is repaired.

In summary, in the three phases the AFR processor combines more than one device fault report and/or environmental information reports from different parts of a computer system and automatically determines the most likely area of the system where a faulty FRU or device or group of devices is located and the devices which are affected by the fault. If there is sufficient evidence then one of the FRUs of the computer system may be declared faulty. This provides both an automated and an early recognition of devices which are faulty which can be used by a system administrator to initiate repairs before a device has completely failed.

Summary of Operation

Figure 13:
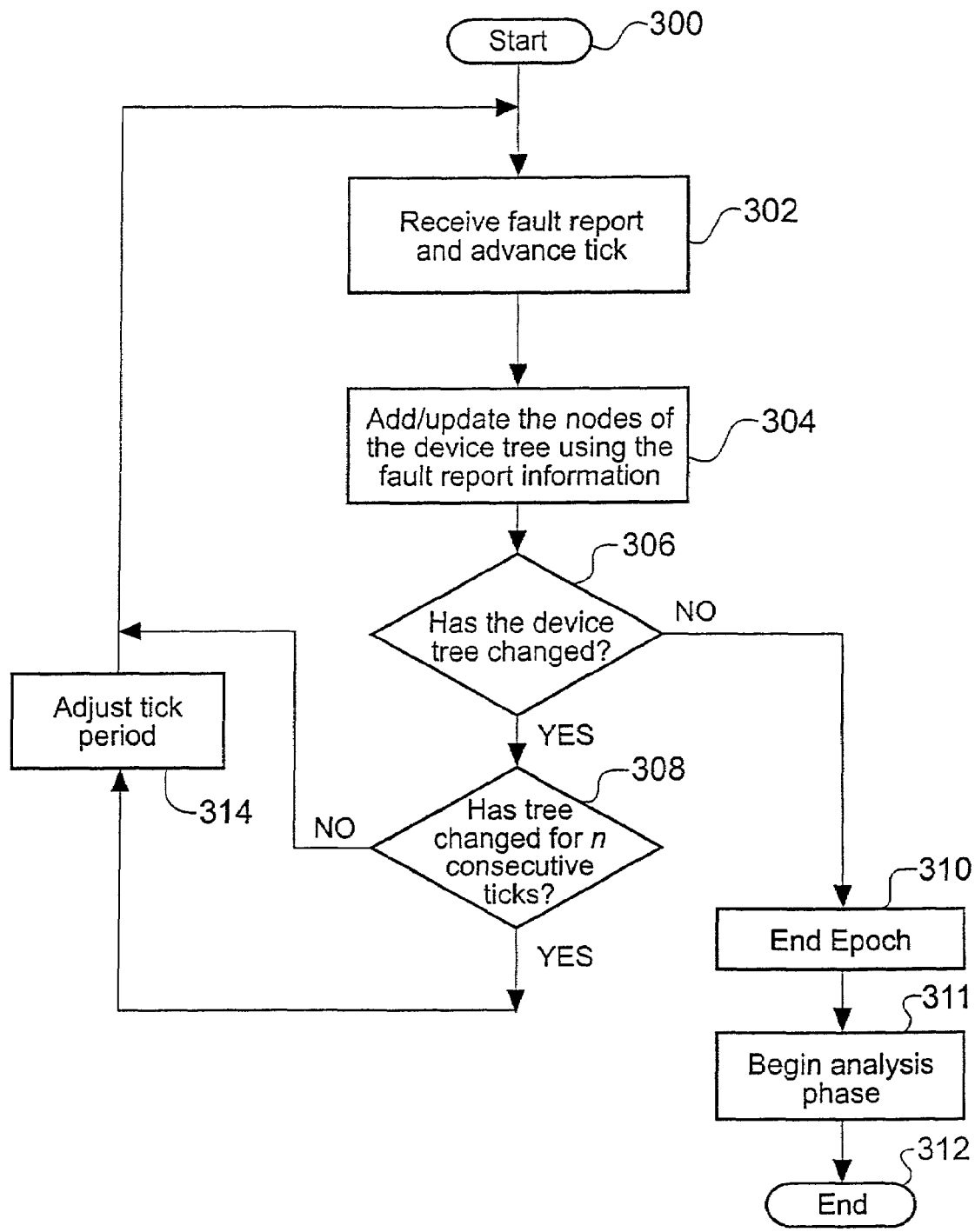
FIG. 13 is a flow diagram illustrating the generation of the device tree model representing possibly faulty devices by the Automatic Fault Response processor.
Figure 14:
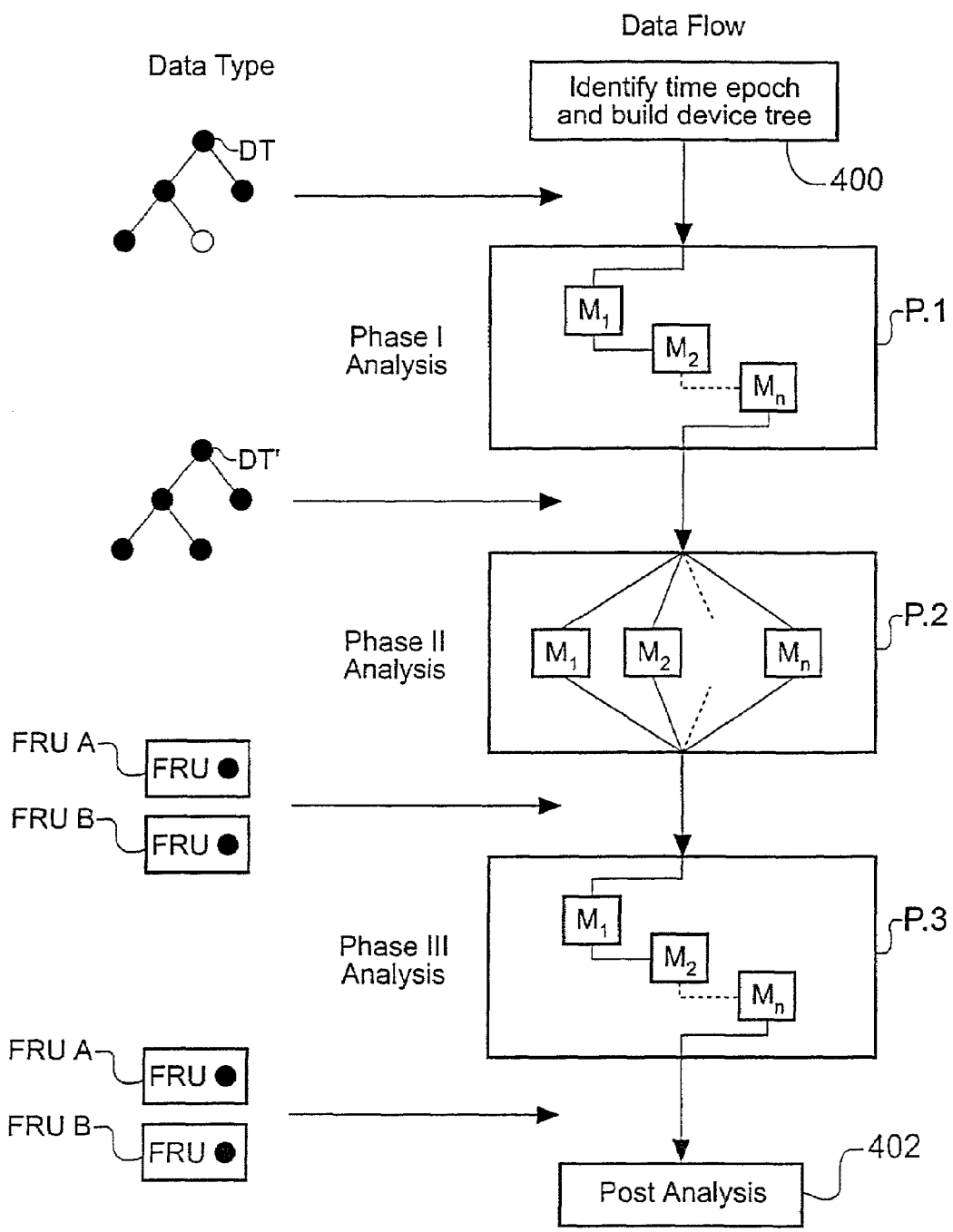
FIG. 14 is a somewhat schematic flow diagram illustrating the operations performed by the Automatic Fault Response processor to identify a FRU containing a faulty device.
Figure 15:
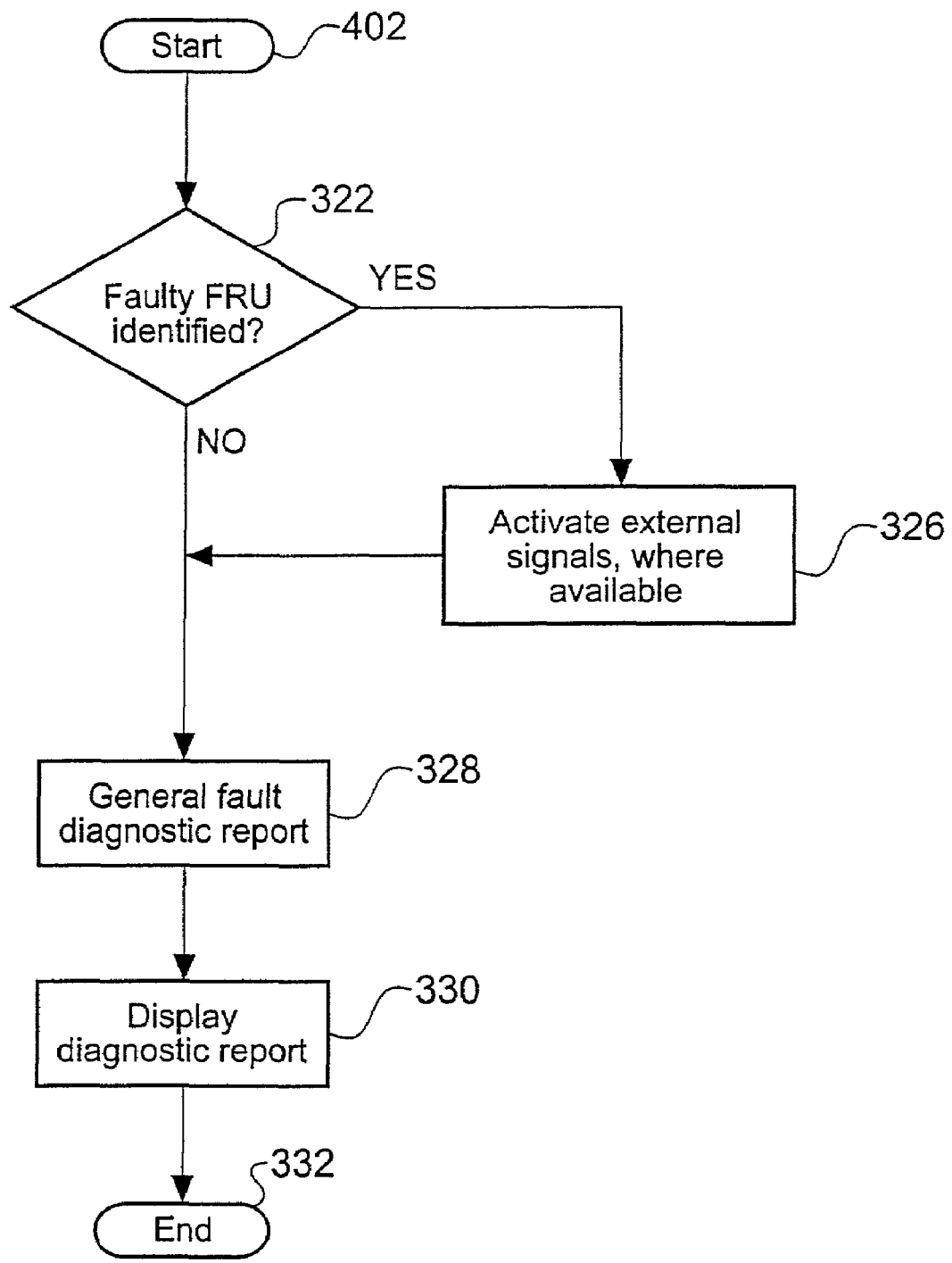
FIG. 15 is a flow diagram illustrating a post-processing operation performed by the Automatic Fault Response processor.

The operation of the AFR processor is summarised in the form of flow diagrams which are shown in FIGS. 13, 14 and 15. FIG. 13 provides a flow diagram which illustrates the operation phase of the AFR processor when identifying the time epochs and building the device tree, before the analysis process is performed as shown in FIG. 14.

FIG. 13 illustrates the process through which the time epochs are identified. The process starts at process step 300, following which the AFR processor receives the fault reports generated by the device drivers at step 302 for the current tick period, and the 'tick' advanced. This forms part of a first pre-analysis phase. At process step 304 the AFR processor uses the information provided by the fault reports to build a device tree, by adding devices to the tree which are indicated or suspected as being possibly faulty or which detect a fault. At decision step 306, it is determined whether the device tree has changed from the previous epoch. If the device tree has not changed, then an end of epoch is declared at process step 310, and at process step 311, the analysis phase is performed and ends at step 312.

If the device tree has changed, a further decision step 308 is provided in order to determine whether or not it is necessary to adjust the tick period. If the device tree has changed for n consecutive tick periods, then the tick period is adjusted to the effect of making the tick period shorter, so that a temporal resolution of the analysis performed with respect to the tick periods is better matched to the arrival rate of the fault reports. If the device tree has changed for n consecutive periods, then the tick period is adjusted at step 314. Otherwise this step is bypassed.

The analysis process is represented by the flow diagram shown in FIG. 14. In FIG. 14, the pre-analysis process of generating the device tree DT from the fault report information collected in a time epoch is represented generally as the step 400. The device tree DT representing the possibly faulty devices is shown as an input to the first analysis phase P.1. The AFR includes a plurality of analysis modules $M_n$, each of the modules being provided for a particular type of analysis, as mentioned above. The analysis modules of the AFR perform the phase 1 analysis by removing fault reports which will not be helpful in identifying the faulty FRU according to the set of rules explained above. Following the phase 1 process P.1, an adjusted device tree DT' is provided as an input to the second phase of the analysis P.2. During the phase 2 analysis P.2, the fault probability of the FRU containing the devices in the device tree DT' is determined from the fault report information provided for the devices in the device tree DT'. Each module $M_n$ is operable to calculate the probability $P_n$ of a FRU being faulty, from information generated by a device embodied within the FRU. At this point one or more FRUs FRUA, FRUB may be identified as possibly being faulty. However during phase three P.3, the environment information is applied to the identified FRUs, in order to refine the estimate of which of the FRUs FRUA, FRUB is faulty. As indicated above in some embodiments, this is effected by identifying whether any of the FRUs FRUA, FRUB returns environment data which indicates an abnormal reading. A threshold probability is then applied and, if any FRU's fault probability exceeds the threshold, this FRU is then declared as being faulty. After the faulty FRU has been identified, the post analysis phase 402 is performed.

The post analysis phase is described by the flow diagram shown in FIG. 15. As shown in FIG. 15, the post analysis phase starts at node 402 and begins with a decision step 322, at which it is determined whether the faulty FRU has been unambiguously located. If the FRU has been unambiguously located, then external signals associated with the FRU or group of FRUs identified as being faulty is or are activated at step 326, to provide an indication to a technician that these FRUs are faulty. Whether or not the faulty FRU or FRUs have not been unambiguously identified, a fault diagnostic report is generated at step 328 which indicates a plurality of possibly faulty FRUs. The fault diagnostic report is then displayed at step 330 on a graphical user interface or communicated to a remotely located site at which appropriate action can be taken to either replace all of the suspected faulty FRUs or to allow a technician to analyse the fault reports and/or environmental data. At this point the process then terminates at step 332.

There has been described a computer system that comprises a processor, memory and a plurality of devices, the processor and the memory being operable to effect the operation of a fault response processor (AFR), and a device driver (GRAPHICS, NETWORK, H2IO, IO2L, SERIAL) for each of the devices. The fault response processor (AFR) is operable to generate a model which represents the processor, the memory and the devices of the computer system and the inter-connection of the processor, memory and the devices (GRAPHICS, NETWORK, H2IO, IO2L, SERIAL). The device driver (GRAPHICS, NETWORK, H2IO, IO2L, SERIAL) for each of the devices is arranged, consequent upon a change of operational status of the device, to generate fault report data indicating whether the change of status was caused internally within the device or externally by another connected device. The devices of the computer system may be formed as a plurality of Field Replaceable Units (FRU). The fault response processor (AFR) is operable, consequent upon receipt of the fault reports from the device drivers (GRAPHICS, NETWORK, H2IO, IO2L, SERIAL) to estimate the location of a FRU containing a faulty device by applying the fault indication to the model. In other embodiments the fault report data includes direction information indicating a connection between the device and the other connected device which caused the external fault. Having identified the faulty device the FRU may be replaced, thereby minimising down time of the computer system.

An improvement in the likelihood of correctly detecting the faulty device can be provided by embodiments in which the fault report data includes an indication of the operational status of the devices. The fault response processor is operable to estimate the location of the faulty device by combining the operational status of the device with the indication as to whether the fault was external or internal. A further improvement may be provided by embodiments in which each of the device drivers are operable, if the fault report data indicates that the change of status was caused externally, to generate fault direction information indicative of a connection from which the external fault is perceived, the fault response processor being operable to estimate the location of the faulty device by applying the fault direction information to the model.

In order to improve the accuracy of the estimated location of the faulty device or the group of devices, the operational status of each device may be one of up, indicating no fault, degraded, indicating that the device is still operational but with impaired performance or down indicating that the device is not operational. By applying this operational status information to the model of the devices of the computer system in combination with the relative direction on the data path from which the fault is perceived, the faulty device or group of devices may be unambiguously located from this information. To this end, for example, the fault response processor may be operable to pre-process the model by comparing the operational status information of the devices connected via a data path, and if the operational status indicates that the preceding device on the data path is degraded or down, the fault direction information indicating that the fault is internal, and the succeeding device is down or degraded, the fault direction information indicating that the fault is external, then fault reports associated with the succeeding device are disregarded in the estimation of the location of the faulty device.

In some embodiments, the fault response processor may be operable to generate a probability measure for at least one device in the model which is representative of a perceived likelihood that the associated device is faulty, the probability measure being generated by applying the fault direction information and the operational status information to the model and to compare the fault probability for the devices in the model with a predetermined threshold, and consequent upon the comparison, to estimate the location of the faulty device from the result of the comparison. The automatic fault response processor may generate a probability measure for the device being controlled by a device driver, or other devices in the model.

The device drivers may be arranged to generate an indication of the operational status of the device they are controlling from performance parameters of the devices they are controlling, such as, for example, a time to respond to a command, an amount of data received via an I/O bus, an amount of data processed by the device, whether information is being correctly processed or from an error interrupt signal generated by the device. Accordingly, by comparing the fault probability measure for nodes representing the device in the model, the location of the faulty device is determined, for example, for the device node having a probability measure which exceeds the predetermined threshold.

For the situation in which more than one probability has been assigned to a device node in the model of the computer system, the fault response processor may be operable to combine the fault probabilities for the same device, the combined fault probability being compared with the predetermined threshold to provide the estimated location of the faulty device.

Generally, in some embodiments, the devices of the computer system are arranged as a plurality of groups, each group containing one or more of the devices and the estimated location produced by the fault response processor is an estimate of one or more of the groups having a device which may be faulty. An advantage is provided by grouping the devices of the computer system in that each of the groups in some embodiments may be embodied within a Field Replaceable Units (FRU). A FRU is a unit containing one or more of the devices of a computer system including the processor and memory. The Field Replaceable Unit is configured and arranged to facilitate replacement, so that one Field Replaceable Unit can be exchanged for another quickly thereby minimizing down time. Some Field Replaceable Units may be 'hot insertable' so that they can be replaced whilst the computer system is operational, thereby avoiding down time.

In some embodiments, environment data representative of at least one parameter value of at least one environment sensor may be generated in association with at least one of the groups, the fault response processor being operable to analyze the environment data in association with the estimate of the group which is faulty to generate an improved estimate of the location of the faulty group from the model. The environment data may be generated by a device driver where the device being controlled includes a component which is an environment sensor.

The term environment data is therefore used to describe any information of parameters, logical flags or signals, or the like, which provide information appertaining to the operational status of components which are being monitored within the computer system. In what can be considered as a further phase of the operation of the fault response processor, the fault response processor operates to apply the environment data to the model of the computer system, in combination with the fault report information to provide a further improved estimate of which of the groups of devices contains the faulty devices. As such, the fault response processor may be operable to produce an improved estimate by identifying one of a plurality of groups of devices which are indicated as being possibly faulty.

The sensors which provide the environment data may be associated with the Field Replaceable Units. As such, the environment data can be used to confirm that a device contained on the Field Replaceable Unit is faulty, or can be used alone to indicate that one of the devices on the Field Replaceable Unit is developing a fault.

In order to increase the likelihood of correctly identifying the faulty group of devices, in some embodiments, the fault response processor may be operable to identify from a time of arrival of the fault reports from the device drivers an analysis interval, and to estimate the location of the faulty device from the fault reports which were generated within the analysis interval.

When a fault occurs within a device, causing a change in the operational status within that device, the fault reports generated by device drivers embodying the present invention can tend to generate fault reports at a rate which can be loosely described as correlated. This is because the fault reports being generated by different or the same devices may be to some extent related, the relationship being caused by the fact that it is the same fault which is causing the fault reports to be generated. As a result, embodiments of the invention are arranged to identify an analysis interval associated with a period over which fault reports associated with a particular fault are generated. The fault reports within this analysis interval (time epoch) are analysed together. The likelihood of correctly identifying the faulty device or group of devices may be therefore improved.

The fault response processor may be, for example, operable to identify the analysis interval by determining a rate of arrival of the fault reports within a predetermined time interval. The predetermined time interval may be shortened, where for a plurality of past time intervals, fault reports have been received. The analysis interval may be determined, for example, from at least one of a time at which the arrival rate increases and a time at which said arrival rate decreases.

In one embodiment, the fault response processor may be operable to generate diagnostic report data representative of the estimate and/or the improved estimate of possibly faulty device, group of devices or FRU and the fault reports, which were used to identify the possibly faulty device, group of devices or FRU. Although the diagnostic report data may be communicated to a remotely located report tool, the computer system in some embodiments may comprise a graphical user interface, wherein the fault response processor may be arranged to produce the fault report on the graphical user interface.

In some embodiments, the model of the computer system may be a device tree or the like having at least two hierarchical levels into which the devices are divided, the devices in each level being connected with at least one device in the next level, the connection representing a data path.

It will be appreciated that although particular embodiments of the invention have been described, many modifications/additions and/or substitutions may be made within the spirit and scope of the present invention as defined in the appended claims.

Furthermore various modifications may be made to the embodiments of the invention herein before described without departing from the spirit and scope of the present invention. In particular, it will be appreciated that the embodiments of the invention can be applied to any form of computer system in which the computer system is comprised of a plurality of utility devices connected to a kernel comprising a processor and memory on which the kernel software is executed. Furthermore it will be appreciated that either the environmental analysis process corresponding to phase III of the Automatic Fault Response process could be performed separately and distinct from phase I and II of the process in which the fault report information is applied to the device tree and a list of FRUs generated, respectively. More particularly, in some embodiments of the present invention the devices of the computer system may not be embodied within FRUs. In such embodiments the AFR will be operable to identify the device which is most likely to be faulty or a group of devices, from one of several groups into which the devices of the computer system are divided.

In some embodiments, fault reports may be discounted in accordance with predetermined rules, when building the device tree. If, for example, a device is identified from past fault reports as being likely to have an intermittent fault, then this information can be used to discount fault reports associated with this or other devices. Furthermore field engineers could write modules to discount information from specific devices that are suspected as misbehaving at customer sites so providing a combination of automated fault report discounting and additional overriding fault report discounting introduced by the field engineer.

What is claimed is:

1. A computer system comprising:
a plurality of devices,
a plurality of device drivers, each device driver operable to monitor an operational status of one of said plurality of devices, and
a fault response processor operable to generate a model which represents the monitored devices of the computer system and an inter-connection of said monitored devices,
wherein said device driver for each of said monitored devices further being operable, consequent upon a change of operational status of said monitored device, to generate fault report data including the operational status of the monitored device and a fault indication of whether the change of operational status of the monitored device was caused internally within the monitored device or externally by another connected device,
wherein said fault response processor is operable, consequent upon receipt of said fault report data from said device drivers, to estimate a location of a faulty device by applying the operational status of one or more of the monitored devices and the fault indication corresponding to one or more of the monitored devices to said model,
wherein said fault response processor is operable to pre-process said model by comparing the operational status information from fault report data associated with successively connected devices in a data path.

2. A computer system as claimed in claim 1, wherein said operational status of each of said monitored devices is at least one of up, indicating no fault, degraded, indicating that the monitored device is still operational but with impaired performance, or down, indicating that the monitored device is not operational.

3. A computer system as claimed in claim 1, wherein each of said device drivers are operable, if said fault report data indicates that said change of operational status was caused externally, to generate fault direction information indicative of a connection from which an external fault is perceived, wherein said fault response processor being operable to estimate the location of said faulty device by applying said fault direction information to said model.

4. A computer system as claimed in claim 3, wherein said fault response processor is operable to generate fault probability measures for one or more monitored devices in the model, wherein each fault probability measure is representative of a perceived likelihood that the monitored device is faulty, wherein the fault probability measures being generated by applying the fault direction information and the operational status information to the model, wherein said fault response processor is operable to compare the fault probability measures for the monitored devices in the model with a predetermined threshold, and consequent upon the comparison, to estimate the location of the faulty device from a result of the comparison.

5. A computer system as claimed in claim 4, wherein said fault response processor is operable, for each monitored device represented in said model having a plurality of fault probability measures associated with the monitored device, to combine the fault probability measures for the monitored device, wherein a combined fault probability measure being compared with said predetermined threshold to provide an estimated location of said faulty device.

6. A computer system as claimed in claim 1, wherein said monitored devices are arranged as a plurality of groups, each group containing one or more monitored devices of said computer system, and wherein an estimated location produced by said fault response processor is an estimate of one or more of said groups having a faulty device.

7. A computer system as claimed in claim 6, wherein environment data representative of a parameter value of at least one environment sensor is generated in association with one of said groups, wherein said fault response processor being operable to analyze said environment data in association with said estimate of one or more of said groups having a faulty device to generate an improved estimate of a location of a faulty group from said model.

8. A computer system as claimed in claim 7, wherein said groups comprising one or more of said monitored devices arranged to form Field Replaceable Units (FRUs).

9. A computer system as claimed in claim 8, wherein said at least one environment sensor is associated with at least one of said Field Replaceable Units (FRUs).

10. A computer system as claimed in claim 7, wherein said fault response processor is operable to generate diagnostic report data representative of said estimate of one or more of said groups having a faulty device and of said improved estimate of the location of the faulty group.

11. A computer system as claimed in claim 10, comprising a graphical user interface, wherein said fault response processor is operable to produce said diagnostic report data on said graphical user interface.

12. A computer system as claimed in claim 1, wherein said model is a device tree having at least two hierarchical levels into which said monitored devices are divided, wherein the monitored devices in each level being connected with a least one monitored device in a subsequent level, wherein each connection representing a data path.

13. A computer system as claimed in claim 1, wherein said fault response processor is operable to generate said model of said computer system from the fault report data, wherein said model representing potentially faulty devices of said computer system.

14. A fault response processor for use in estimating a location of at least one of a plurality of devices of a system which is faulty, said fault response processor being operable to:
generate a data model having a structure which represents said plurality of devices and the inter-connection of said devices,
receive fault report data generated by device drivers following a change in the operational status of one or more of the devices, wherein said fault report data including the operational status of the device and a fault indication of whether the change in the operational status was caused internally within the device or externally by another connected device,
pre-process said model by comparing the operational status information from fault report data associated with successively connected devices in a data path, and
estimate a location of a faulty device, within said model, by applying the operational status of one or more of the devices and the fault indication corresponding to one or more of the devices to the model.

15. A fault response processor as claimed in claim 14, wherein said operational status of said device is one of up, indicating no fault, degraded, indicating that the device is still operational but with impaired performance, or down, indicating that the device is not operational.

16. A fault response processor as claimed in claim 14, wherein if said fault report data indicates that said change of operational status was caused externally, the device drivers are operable to generate fault direction information indicative of a relative direction on a connection from which an external fault is perceived, wherein said fault response processor being operable to estimate the location of said faulty device by applying said fault direction information to said model.

17. A fault response processor as claimed in claim 16, wherein said fault response processor is operable to generate fault probability measures associated with one or more devices in the model, wherein each fault probability measure is representative of a perceived likelihood that the device is faulty, wherein the fault probability measures being generated by applying the fault direction information and the operational status information to the model, wherein said fault response processor is operable to compare the fault probability measures for the devices in the model with a predetermined threshold, and consequent upon the comparison, to estimate the location of the faulty device from a result of the comparison.

18. A fault response processor as claimed in claim 17, wherein said fault response processor is operable, for each device represented in said model having a plurality of fault probability measures associated with said device generated from said fault report data, to combine the fault probability measures for the device, wherein a combined fault probability measure being compared with said predetermined threshold to provide an estimated location of said faulty device.

19. A fault response processor as claimed in claim 17, wherein said devices are arranged as a plurality of groups, each group containing one or more devices of said computer system, and wherein said estimated location produced by said fault response processor is an estimate of one or more of said groups having a faulty device.

20. A fault response processor as claimed in claim 19, wherein environment data representative of a parameter value of at least one environment sensor is generated in association with a performance of one of said groups, wherein said fault response processor being operable to analyze said environment data in association with said estimate of one or more of said groups having a faulty device to generate an improved estimate of a location of a faulty group from said model.

21. A fault response processor as claimed in claim 20, wherein said groups comprising one or more of said devices are arranged to form Field Replaceable Units (FRUs).

22. A fault response processor as claimed in claim 20, wherein said fault response processor is operable to generate diagnostic report data representative of said estimate of one or more of said groups having a faulty device and of said improved estimate of the location of the faulty group.

23. A fault response processor as claimed in claim 22, wherein said fault response processor is operable to produce said diagnostic report data on a graphical user interface.

24. A fault response processor as claimed in claim 14, wherein said model is a device tree having at least two hierarchical levels into which said devices are divided, wherein the devices in each level being connected with at least one device in a subsequent level, wherein each connection representing a data path.

25. A fault response processor as claimed in claim 14, wherein said fault response processor is operable to generate said model of said system from the fault report data, wherein said model representing potentially faulty devices of said system.

26. A method of locating faulty devices in a system including a plurality of devices, said method comprising:

monitoring an operational status of one or more of the plurality of devices;

generating a model of said system, wherein the model includes a structure representing the plurality of monitored devices and the inter-connection of the monitored devices via at least one data path;

generating fault report data consequent upon a change of operational status of at least one of said monitored devices, wherein said fault report data including the operational status of the monitored device and a fault indication of whether the change of operational status of the monitored device was caused internally within the monitored device or externally by another connected device;

pre-processing said model by comparing the operational status information from fault report data associated with successively connected devices in a data path;

estimating a location of a faulty device, within said model, by applying the operational status of one or more of the monitored devices and the fault indication corresponding to one or more of the monitored devices to the model.

27. A method of locating faulty devices as claimed in claim 26, wherein said operational status of each of said monitored devices is one of up, indicating no fault, degraded, indicating that the monitored device is still operational but with impaired performance, or down, indicating that the monitored device is not operational.

28. A method of locating faulty devices as claimed in claim 26, further comprising generating fault direction information indicative of a relative direction on a connection from which an external fault is perceived if said fault report data indicates that said change of operational status was caused externally, wherein said estimating the location of the faulty device comprising applying said fault direction information to said model.

29. A method as claimed in claim 26, further comprising comparing the operational status information from fault report data associated with successively connected devices in a data path, wherein if the operational status indicates that a preceding device on the data path is degraded or down, fault direction information is generated for the preceding device indicating that a fault is internal, and wherein if the operational status indicates that a succeeding device on the data path is down or degraded, fault direction information is generated for the succeeding device indicating that a fault is external, wherein said estimating the location of said faulty device comprises disregarding fault report data associated with said succeeding device and estimating the location of said faulty device from remaining fault report data.

30. A method as claimed in claim 26, further comprising:

generating fault probability measures for one or more monitored devices in said model, wherein each fault probability measure is representative of a perceived likelihood that said monitored device is faulty, wherein said fault probability measures being generated by applying the fault direction information and the operational status information to the model, comparing said fault probability measures for the monitored devices in said model with a predetermined threshold, and consequent upon the comparison, estimating said location of said faulty device from a result of the comparison.

31. A method as claimed in claim 30, further comprising, for each monitored device represented in said model having a plurality of fault probability measures associated with said monitored device from said fault report data, combining the fault probability measures for the monitored device, and then comparing a combined fault probability measure with said predetermined threshold to provide an estimated location of said faulty device.

32. A method as claimed in claim 30, further comprising arranging said monitored devices as a plurality of groups, each group containing one or more monitored devices of said system, wherein said estimating the location of said faulty device provides an estimate of one or more of said groups having a faulty device.

33. A method as claimed in claim 32, further comprising:
generating environment data representative of a parameter value of at least one sensor associated with a performance of at least one group of monitored devices,
analyzing said environment data in association with said estimate of one or more of said groups having a faulty device to generate an improved estimate of a location of a faulty group from said model.

34. A method as claimed in claim 32, wherein said groups comprising one or more monitored devices arranged to form Field Replaceable Units (FRUs).

35. A method as claimed in claim 33, further comprising generating diagnostic report data representative of said estimate of one or more of said groups having a faulty device and of said improved estimate of the location of the faulty group.

36. A method as claimed in claim 35, wherein said generating said diagnostic report data includes producing said diagnostic report data on a graphical user interface.

37. A method as claimed in claim 26, wherein said model is a device tree having at least two hierarchical levels into which said monitored devices are divided, wherein the monitored devices in each level being connected with at least one monitored device in a subsequent level, wherein each connection representing a data path.

38. A method as claimed in claim 28, wherein said generating said model of said system, comprises:
identifying the fault report data generated within a time epoch, and
generating said model using said fault indication, said operational status information and said fault direction information, wherein said model representing potentially faulty devices of said system.

39. A computer readable storage medium comprising program instructions, wherein the program instructions are executable by a processor to:
monitor an operational status of a plurality of devices;
generate a model of a system, wherein the model includes a structure representing the plurality of monitored devices included in the system and the inter-connection of the monitored devices via at least one data path;
generate fault report data consequent upon a change of operational status of at least one of said monitored devices, wherein said fault report data including the operational status of the monitored device and a fault indication of whether the change of operational status of the monitored device was caused internally within the monitored device or externally by another connected device;
pre-process said model by comparing the operational status information from fault report data associated with successively connected devices in a data path; and
estimate a location of a faulty device, within said model, by applying the operational status of one or more of the monitored devices and the fault indication corresponding to one or more of the monitored devices to the model.

40. A computer system comprising:
a plurality of devices;
a plurality of device drivers, each device driver operable to monitor an operational status of one of said plurality of devices; and
a fault response processor operable to generate a model which represents the monitored devices of the computer system and an inter-connection of said monitored devices;
wherein said device driver for each of said monitored devices being further operable, consequent upon a change of operational status of said monitored device, to generate fault report data including the operational status of the monitored device and a fault indication of whether the change of operational status was caused internally within the monitored device or externally by another connected device;
wherein said fault response processor is operable, consequent upon receipt of said fault report data from said device drivers, to estimate a location of a faulty device by applying the operational status of one or more of the monitored devices and the fault indication corresponding to one or more of the monitored devices to said model;
wherein said fault response processor is operable to pre-process said model by comparing the operational status information from fault report data associated with successively connected devices in a data path, wherein if the operational status for a preceding device on the data path has changed, fault direction information is generated for the preceding device indicating that a fault is internal, and wherein if the operational status for a succeeding device on the data path has changed, fault direction information is generated for the succeeding device indicating that a fault is external, wherein the fault report data associated with said succeeding device is disregarded in said estimation of the location of said faulty device.

41. A computer system comprising:
a plurality of devices;
a plurality of device drivers, each device driver operable to monitor an operational status of one of said plurality of devices; and
a fault response processor operable to generate a model which represents the monitored devices of the computer system and an inter-connection of said monitored devices;
wherein said device driver for each of said monitored devices being further operable, consequent upon a change of operational status of said monitored device, to generate fault report data including the operational status of the monitored device and a fault indication of whether the change of operational status was caused internally within the monitored device or externally by another connected device;
wherein said fault response processor is operable, consequent upon receipt of said fault report data from said device drivers, to estimate a location of a faulty device by applying the operational status of one or more of the monitored devices and the fault indication corresponding to one or more of the monitored devices to said model;
wherein said fault response processor is further operable to generate fault probability measures for one or more monitored devices in the model, wherein each fault probability measure is representative of a perceived likelihood that the monitored device is faulty, wherein the fault probability measures being generated by applying fault direction information and the operational status information to the model, wherein said fault response processor is operable to compare the fault probability measures for the monitored devices in the model with a predetermined threshold, and consequent upon the comparison, to estimate the location of the faulty device from the result of the comparison;

wherein, for each monitored device represented in said model having a plurality of fault probability measures associated with the monitored device, said fault response processor is operable to combine the fault probability measures for the monitored device, wherein the combined fault probability measure being compared with said predetermined threshold to provide an estimated location of the faulty device.

42. The computer system as claimed in claim 41, wherein said fault response processor is operable to determine a rate of arrival of said fault report data and to define said analysis interval from at least one of a time at which said rate of arrival increases and a time at which said rate of arrival decreases.

43. A fault response processor for use in estimating a location of at least one of a plurality of devices of a system which is faulty, said fault response processor being operable to:
   generate a data model having a structure which represents said plurality of devices and the inter-connection of said devices;
   receive fault report data generated by device drivers following a change in the operational status of one or more of the devices, wherein said fault report data including the operational status of the device and a fault indication of whether the change in the operational status was caused internally within the device or externally by another connected device; and
   estimate a location of a faulty device, within said model, by applying the operational status of one or more of the devices and the fault indication corresponding to one or more of the devices to the model;
   wherein said fault response processor is operable to pre-process said model by comparing the operational status information from fault report data associated with successively connected devices in a data path, wherein if the operational status indicates that a preceding device on the data path is degraded or down, fault direction information is generated for the preceding device indicating that a fault is internal, and wherein if the operational status indicates that a succeeding device on the data path is down or degraded, fault direction information is generated for the succeeding device indicating that a fault is external, wherein the fault report data associated with the succeeding device is disregarded in said estimation of the location of said faulty device.

44. A fault response processor for use in estimating a location of at least one of a plurality of devices of a system which is faulty, said fault response processor being operable to:
   generate a data model having a structure which represents said plurality of devices and the inter-connection of said devices;
   receive fault report data generated by device drivers following a change in the operational status of one or more of the devices, wherein said fault report data including the operational status of the device and a fault indication of whether the change in the operational status was caused internally within the device or externally by another connected device;
   estimate a location of a faulty device, within said model, by applying the operational status of one or more of the devices and the fault indication corresponding to one or more of the devices to the model;
   generate fault probability measures for one or more monitored devices in the model, wherein each fault probability measure is representative of a perceived likelihood that the monitored device is faulty, wherein the fault probability measures being generated by applying fault direction information and the operational status information to the model;
   compare the fault probability measures for the monitored devices in the model with a predetermined threshold, and consequent upon the comparison, to estimate the location of the faulty device from the result of the comparison; and
   for each monitored device represented in said model having a plurality of fault probability measures associated with the monitored device, combine the fault probability measures for the monitored device, and compare the combined fault probability measure with said predetermined threshold to provide an estimated location of the faulty device.

45. A fault response processor as claimed in claim 44, wherein:
   said fault response processor is operable to identify from a time of arrival of said fault report data an analysis interval, and wherein said fault response processor is operable to estimate said location of said faulty device, a location of a faulty group of devices or a location of a faulty Field Replaceable Units from the fault report data generated within said analysis interval, and
   said fault response processor is operable to determine a rate of arrival of said fault report data and to define said analysis interval from at least one of a time at which said rate of arrival increases and a time at which said rate of arrival decreases.

46. A method of locating faulty devices in a system including a plurality of devices, said method comprising:
   monitoring an operational status of one or more of the plurality of devices;
   generating a model of said system, wherein the model includes a structure representing the plurality of monitored devices and the inter-connection of the monitored devices via at least one data path;
   generating fault report data consequent upon a change of operational status of at least one of said devices, wherein said fault report data including the operational status of the monitored device and a fault indication of whether the change of operational status of the monitored device was caused internally within the monitored device or externally by another connected device; and
   estimating a location of a faulty device, within said model, by applying the operational status of one or more of the monitored devices and the fault indication corresponding to one or more of the monitored devices to the model;
   generating fault probability measures for one or more monitored devices in the model, wherein each fault probability measure is representative of a perceived likelihood that the monitored device is faulty, wherein the fault probability measures being generated by applying fault direction information and the operational status information to the model;
   comparing the fault probability measures for the monitored devices in the model with a predetermined threshold, and consequent upon the comparison, to estimate the location of the faulty device from the result of the comparison; and
   for each monitored device represented in said model having a plurality of fault probability measures associated with the monitored device, combining the fault probability measures for the monitored device, and then comparing the combined fault probability measure with said predetermined threshold to provide an estimated location of the faulty device.

47. A method as claimed in claim 46, wherein said identifying said analysis interval comprises:

determining a rate of arrival of said fault report data, and determining said analysis interval from at least one of a time at which said rate of arrival increases and a time at which said rate of arrival decreases.

* * * * *